United States Patent
Pressacco et al.

(10) Patent No.: US 10,239,097 B2
(45) Date of Patent: Mar. 26, 2019

(54) METHOD AND APPARATUS FOR THE RECOVERY AND REGENERATION OF METAL POWDER IN EBM APPLICATIONS

(71) Applicant: LIMACORPORATE S.P.A., San Daniele del Friuli (UD) (IT)

(72) Inventors: Michele Pressacco, Udine (IT); Marco Regis, Udine (IT)

(73) Assignee: Limacorporate S.P.A., San Daniele del Friuli (UD) (IT)

(*) Notice: Subject to any disclaimer, the term of this patent is extended or adjusted under 35 U.S.C. 154(b) by 859 days.

(21) Appl. No.: 14/448,801

(22) Filed: Jul. 31, 2014

(65) Prior Publication Data

US 2015/0034123 A1    Feb. 5, 2015

(30) Foreign Application Priority Data

Jul. 31, 2013   (EP) ..................... 13178734

(51) Int. Cl.
   *B08B 5/00*     (2006.01)
   *B22F 3/105*    (2006.01)
   (Continued)

(52) U.S. Cl.
   CPC .............. *B08B 5/02* (2013.01); *B22F 3/1055* (2013.01); *B22F 9/04* (2013.01);
   (Continued)

(58) Field of Classification Search
   None
   See application file for complete search history.

(56) References Cited

U.S. PATENT DOCUMENTS

2008/0160332 A1* 7/2008 Dighe .................. B23K 3/0607
                                                                  428/554
2011/0061591 A1* 3/2011 Stecker ................. B22F 3/1055
                                                                  118/663
(Continued)

FOREIGN PATENT DOCUMENTS

EP         2 156 941 A1    2/2010

OTHER PUBLICATIONS

Al-Bermani S. S. et al., "The Origin of Microstructural Diversity, Texture, and Mechanical Properties in Electron Beam Melted Ti-6A1-4V" vol. 41, No. 13, dated Aug. 31, 2010, 13 pages.

*Primary Examiner* — Eric W Golightly
*Assistant Examiner* — Arlyn I Rivera-Cordero
(74) *Attorney, Agent, or Firm* — Hickman Palermo Becker Bingham LLP; Malgorzata A. Kulczycka

(57) ABSTRACT

The present invention relates to a method and an associated apparatus (1) for the recovery and regeneration of metal powder in EBM (Electron Beam Melting) applications. The method is of the type which envisages a step for recovery of weakly sintered powders inside a cleaning chamber (2) incorporating at least one compressed-air nozzle with supply, where necessary, of powder for sandblasting three-dimensional objects obtained by means of EBM sintering of the metal powders; according to the invention it is envisaged supplying into the cleaning chamber (2) metal powders having a predetermined low oxygen content and there is also a powder recirculating system (3) comprising at least one first buffer tank (9) inside which the regenerated powders are deposited for renewed supply of the aforementioned chamber (2).

7 Claims, 2 Drawing Sheets

(51) Int. Cl.
*B22F 9/04* (2006.01)
*B33Y 40/00* (2015.01)
*B29C 64/35* (2017.01)
*B08B 5/02* (2006.01)

(52) U.S. Cl.
CPC . *B22F 2003/1059* (2013.01); *B22F 2009/045* (2013.01); *B29C 64/35* (2017.08); *B33Y 40/00* (2014.12); *Y02P 10/24* (2015.11); *Y02P 10/295* (2015.11)

(56) References Cited

U.S. PATENT DOCUMENTS

| | | | |
|---|---|---|---|
| 2011/0104369 A1* | 5/2011 | Kim | C23C 24/04 427/180 |
| 2012/0051962 A1* | 3/2012 | Imam | B22F 3/105 419/2 |
| 2012/0052145 A1* | 3/2012 | Chen | B08B 5/02 425/217 |
| 2014/0186205 A1* | 7/2014 | O'Neill | B22F 1/0081 419/26 |

* cited by examiner

METHOD AND APPARATUS FOR THE RECOVERY AND REGENERATION OF METAL POWDER IN EBM APPLICATIONS

BENEFIT CLAIM

This application claims the benefit under 35 U.S.C. § 119 of priority from European Patent Office (EPO) application 13178734.3, filed Jul. 31, 2013, the entire contents of which are hereby incorporated by reference for all purposes as if fully set forth herein.

FIELD OF APPLICATION

The present invention refers to a method and to an associated apparatus for the recovery and regeneration of metal powders in EBM (Electron Beam Melting) applications.

More particularly, but not exclusively, the invention relates to a method for the recovery and regeneration of metal powders which are able to incorporate oxygen during the working process which they must undergo and the description below is provided with reference to this specific example of embodiment with the sole aim of simplifying illustration thereof.

Even more particularly, the invention relates to the treatment of metal powders to be used in EBM applications both in the biomedical sector and in the aeronautical sector in order to obtain components made of titanium or alloys thereof, such as Ti64 (Ti-6Al-4V), or cobalt-chrome (Co-CrMo) or also magnesium and alloys thereof.

PRIOR ART

As is well known in this specific technical sector, during recent years a technology for performing melting using electron beams, known as EBM (Electron Beam Melting), has become increasingly well-established, this technology being used to produce semi-finished three-dimensional objects or components by employing metal powders. This technology is described for example in PCT patent application No. WO2011/008143 in the name of the Swedish company Arcam.

EBM laser technology uses a focused electron beam according to principles already developed in the sector of additive production technologies, known for example as additive manufacturing, and exploits the properties of some metal powders which may be sintered when struck by the aforementioned electron beam.

The starting metal powders are essential for the successful outcome of the sintering process. They are stored in tanks which are associated with the EBM machines and from which predetermined quantities of powders are taken whenever the melting operations are repeated.

Normally, a predefined quantity of powder is taken from the tank and distributed over a working area of the EBM machine. The working areas may be very different from each other depending on the type of article to be sintered, but for the purposes of the present invention, it may be considered that these areas have a substantially plate-like form and that the three-dimensional objects are formed in superimposed layers.

The melting energy takes the form of an electron beam which strikes the working area; moreover, in order to allow optimum execution of the process, the working process must be carried out under conditions of an atmospheric vacuum in order to prevent possible de-focusing of the electron beam following interaction thereof with the molecules of the atmosphere.

It should also be noted that bombarding with electrons charges electrostatically the metal powder used during processing and it is indispensable that the layer to be melted should be compact and adhere to the underlying surface, in order to prevent the formation of clouds of charged particles which could move towards the source of the beam, which has an opposite polarity.

In order to prevent the powders from becoming electrostatically charged, the process envisages an intermediate step between distribution of the powder over the working area and melting of the said powder.

This intermediate step envisages that the powder distributed over the working area is heated slightly in order to form an already weakly sintered layer, the powders of this layer being unaffected by the aforementioned electrostatic phenomena.

At the end of each working process, the three-dimensional melt-sintered objects are nestled inside blocks formed by more weakly sintered powders. The objects must be first freed from the powders for example by means of a special compressed-air jet, with the result that the excess powders, or powders to be regarded as processing waste for subsequent external chemical/physical regeneration treatment, will be recovered in an apparatus known as a Powder Recovery System (PRS).

This apparatus comprises a cleaning chamber equipped with a movable nozzle which emits the compressed-air jet and a system for performing recirculation with subsequent filtering of the powders; all of this is similar to a conventional sandblasting machine. The supplying of powders in the compressed-air jet facilitates the erosion cleaning operations.

The compressed air which is emitted from the nozzle releases and removes the particles of weakly sintered powder which surround the melt-sintered objects and these particles are also filtered in order to eliminate the parts with a smaller particle size (potentially a fire hazard) and reintroduced into the cleaning chamber in order to increase the erosion effect of the powder-supplying jet.

By means of the PRS system it is also possible to recover the waste powders which, once filtered with a sieve in order to eliminate any impurities, may be reused for the EBM process.

The current process of using powders for an EBM process envisages the following steps:
 loading a predetermined batch of powder into the EBM apparatus;
 using the powder for the production of melt-sintered three-dimensional objects;
 at the end of each processing operation, recovery of the sintered powder and loading thereof into the tanks of the machine.

This sequence of steps continues uninterrupted until all the powder in the batch has been used.

The problems described above are common to all EBM applications, but are particularly evident when powders of titanium, or its alloys, or powders of cobalt-chrome, magnesium and the like are used in an EBM process.

In fact, with reference solely to the example of titanium, it has been noted that, whenever titanium powder is reused, the oxygen content in the residual powder increases significantly.

This phenomenon is due to the presence of residual atmospheric molecules in the melting chamber and in particular is due to the presence of water vapour.

At the process temperatures (approx. 720° C.), the water molecules are broken down into hydrogen and oxygen and, due to the particular affinity of titanium for this latter element, which is increased by the high temperature to which the sintered particles are exposed and their high reactivity, i.e. to the surface energy, which is much higher than that of the compact (or bulk) material, the oxygen is absorbed easily onto the surface of the powders.

This results in a gradual oxidation of the starting powders since the weakly sintered powder with a higher oxygen content is introduced again into the tanks of the machine for reuse thereof.

The gradual increase in the percentage of oxygen in the EBM powders has two negative effects which have serious consequences:

gradual modification of the composition of the sintered metal objects, which may give rise to the production of material which is non-compliant from the point of view of chemical composition, considering the limits imposed by regulations (generally it is desirable that the finished product should not have a percentage of oxygen greater than the aforementioned limit, for example 0.2% for Ti6Al4V;

lack of uniformity of the melting process since the electron beam management parameters set for optimum execution of the process may be subject to some major variations depending on the chemical composition of the starting powder.

It must be considered in fact that, in order to melt a powder with a higher oxygen content, it is necessary to set a greater quantity of energy to be imparted to the electron beam, and this greater quantity of energy to be supplied may result in the need to modify the parameters for each operating cycle of the system so as to ensure correct melting of the material. This gives rise to many complications during programming of the apparatus intended for EBM applications.

Moreover, this obviously limits reuse of the powders to only a few cycles and requires continuous replenishing of the machines with fresh powder, resulting in decidedly higher costs.

The technical problem forming the basis of the present invention is that of devising a method and an associated apparatus having respective functional and structural characteristics such as to allow effective recovery and regeneration of metal powders in EBM (Electron Beam Melting) applications, managing in particular to reduce or eliminate the oxygen content of these powders.

Another object of the present invention is to enable regulation and control over the oxygen content in the batch of metal powders used for production within the EBM apparatus.

A further object of the present invention is to reduce to a minimum the provision of new batches of metal powder, allowing recovery and regeneration of the processing powders for a plurality of cycles, while keeping the oxygen content below a predetermined threshold value or in any case within a predetermined stable range of values.

SUMMARY OF THE INVENTION

The proposed solution forming the basis of the present invention is that of providing an intermediate step where it is possible to perform topping-up or at least partial replenishing with ELI powders possessing a predetermined low oxygen content at an access point of the powder recovery path, for example inside the cleaning chamber in which the weakly sintered powders surrounding the three-dimensional objects obtained by means of EBM melting are eroded by means of sandblasting.

In other words, the idea underlying the invention envisages treating the weakly sintered powders, which have a higher oxygen content, by mixing them thoroughly with powders which have a lower oxygen content, so as to obtain powders in which the oxygen content is restored to an initial value or in any case lies below a desired threshold or a desired range.

This mixture, which will be referred to below as a "regeneration mixture," is obtained by introducing ELI powders with a predetermined low oxygen content at an accessible point along the path for post-melting recovery of the weakly sintered powders, for example even already inside the cleaning chamber where the weakly sintered powders which surround the three-dimensional objects obtained by means of EBM melting are sandblasted.

Moreover, in order to avoid contaminating the powders with pollutants originating from the cleaning/sandblasting chamber and in order to facilitate the operation of maintaining a low oxygen content in the powders, it is also envisaged providing a powder regeneration apparatus in which the cleaning/sandblasting chamber is made with the same metallic materials as the metal powders used in EBM processing.

In particular, in the context of the present invention, the walls and the components of the cleaning/sandblasting chamber are made of the same metallic material as the components made by means of EBM treatment, namely titanium or alloys thereof, cobalt-chrome or magnesium and alloys thereof.

On the basis of the aforementioned proposed solution, the technical problem is solved by a method for the recovery and regeneration of metal powders in EBM (Electron Beam Melting) applications, which envisages a step for recovery of weakly sintered powders inside a cleaning chamber including at least one compressed-air nozzle with supplying, where necessary, of powder for sandblasting three-dimensional objects obtained by means of EBM sintering of said metal powders, characterized in that it comprises a path for recovery and regeneration of said powders, comprising at least a first buffer tank inside which the regenerated powders are deposited and in that ELI metal powders with a predetermined low oxygen content are supplied at an access point along said recovery and regeneration path.

Advantageously, the supply of said ELI metal powders with a predetermined low oxygen content is performed directly inside said cleaning chamber.

The technical problem is also solved by an apparatus for the recovery and regeneration of metal powders in EBM (Electron Beam Melting) applications in which there is provided: a cleaning chamber incorporating at least one compressed-air nozzle with supply, where necessary, of powder for sandblasting three-dimensional objects obtained by means of EBM sintering of said metal powders and for recovery of weakly sintered powders; a path for recovery of said weakly sintered powders downstream of said chamber and incorporating filter means, characterized in that it comprises an access point along said recovery path for supplying ELI metal powders with a predetermined low oxygen content and at least one first buffer tank inside which the recovered powders are deposited.

In a preferred embodiment access to said recovery path is performed directly inside said cleaning chamber.

Moreover, the apparatus according to the invention comprises a second buffer tank connected downstream of and supplied by the first buffer tank for temporary storage of regenerated powders to undergo certification.

Advantageously, the sandblasting cleaning chamber is formed with walls made of the same metallic material as the metal powders from which said objects are made.

More particularly, the aforementioned walls are made of titanium or alloys thereof, cobalt-chrome or magnesium and alloys thereof depending on the powders used to produce the objects obtained by means of EBM melting.

The characteristic features and advantages of the method and the apparatus according to the present invention will emerge from the description hereinbelow, of an example of embodiment, provided by way of a non-limiting example, with reference to the accompanying drawings.

DETAILED DESCRIPTION

Figure 1:
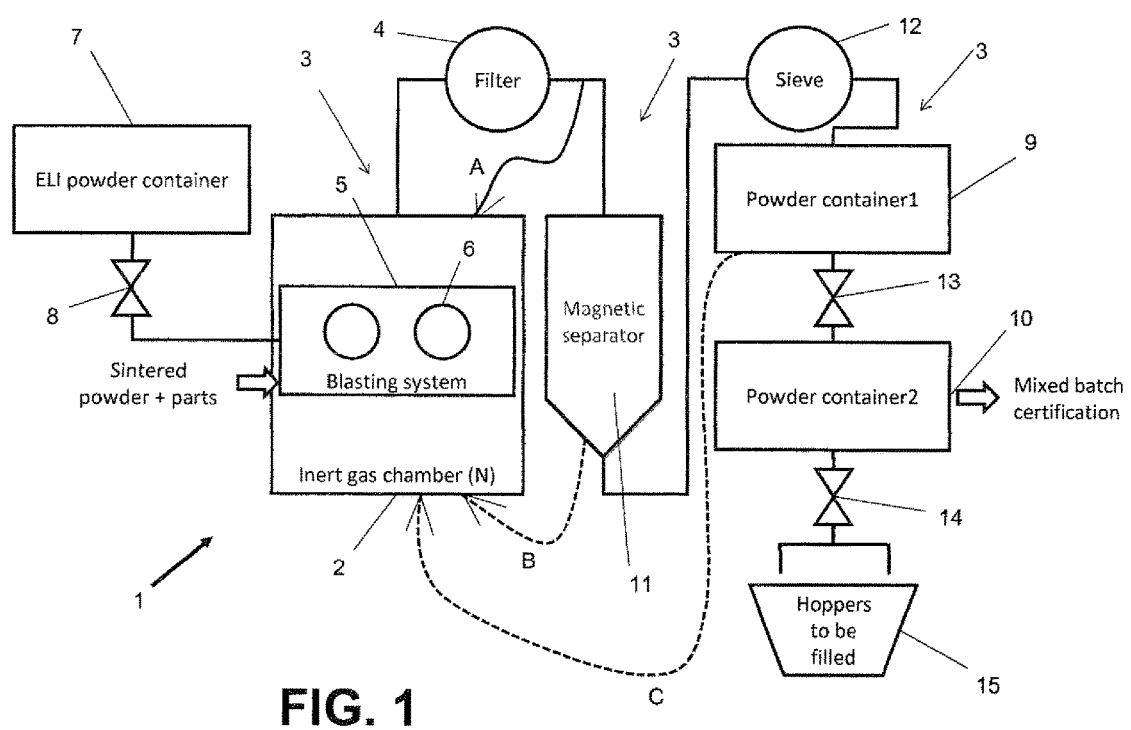
FIG. 1 shows a schematic view of an apparatus for regenerating metal powders in EBM applications, realized in accordance with the present invention.

With reference to these figures, 1 denotes overall and shows in schematic form an apparatus for the regeneration of metal powders in EBM applications, realized in accordance with the present invention and, in particular, for implementing the method according to the present invention.

The apparatus 1 may be defined as a whole as a system for recovery of the powders or Powder Recovery System (PRS) which is normally associated with or arranged downstream of EBM (Electron Beam Melting) apparatus for sintering by means of electron beam melting of three-dimensional objects using metal powders.

In particular, but not exclusively, the metal powders may be powders of titanium, or alloys thereof such as Ti64 (Ti-6Al-4V), or powders of cobalt-chrome molybdenum (CoCrMo) or also magnesium and alloys thereof. The metallic material of the powder does not represent a limitation of the Applicant's rights.

The three-dimensional objects or components obtained by means of electron beam melting may be intended for the biomedical sector, for example for arthroprosthetic orthopaedics, or in the aeronautical or aerospace sector without this representing any limitation of the Applicant's rights.

The apparatus 1 comprises a sandblasting cleaning chamber 2 and a powder recovery and recirculating system, denoted overall by 3, incorporating powder filter means 4.

As a whole, the apparatus 1 comprises a powder treatment path which also includes the cleaning chamber 2.

Advantageously, in accordance with the present invention, it is envisaged supplying the same powders from which the sintered three-dimensional objects are made at an access point along the treatment path. Hereinbelow we shall see which access points along the treatment path have proved to be most convenient in the light of the experiments carried out by the applicant.

As already mentioned above, the cleaning chamber 2 is provided internally with at least one movable nozzle situated at the end of a flexible pipe, not shown in that conventional.

A jet of compressed air is emitted from this nozzle with the supply of powder in order to increase the erosion capacity of the nozzle itself.

The cleaning chamber 2 is similar to a sandblasting machine in which the compressed air emitted from the nozzle frees by means of erosion and removes the particles of weakly sintered powder which surround the melt-sintered objects.

The melt-sintered three-dimensional objects are formed on a plate-like support 5 which is positioned inside the cleaning chamber 2 at the end of the processing step within the EBM apparatus and then removed before the start of processing in order to prevent contamination of the powders.

The support 5 has, defined thereon, working areas 6 on which the three-dimensional objects were formed in superimposed layers.

In a first embodiment of the present invention it is envisaged providing a system for supplying the same powders from which the sintered three-dimensional objects are made directly inside the chamber 2.

In particular, the apparatus 1 also comprises a tank 7 or container for the metal powders.

This tank 7 contains powders which will be referred to by the abbreviation "ELI" which stands for "Extra Low Interstitial".

Moreover, these ELI powders have a low oxygen content compared to the percentage of metal powder, which may be defined as being in the range of 0.08% to 0.12% by volume, for example, in the case of Ti6Al4V. In any case, these ELI powders contain oxygen in a percentage amount compatible for performing EBM processing operations with excellent production yields.

The tank 7 is connected to the chamber 2 by means of a supply line 8 provided with valve means for introducing predetermined amounts of powder directly into the sandblasting environment and increasing the erosion effect of the compressed-air jet with powder supply. In this way, ELI metal powders having already a controlled and preferred oxygen content are introduced into the sandblasting environment.

Obviously, the chamber 2 is substantially hermetically sealed and the inlets for supply of the powders from the tank 7, the support 5 for the objects as well as the outlet to the filter means 4 are provided with sealed openings and closures.

Advantageously, according to the present invention, the sandblasting cleaning chamber 2 is formed with walls made of the same metallic material as the metal powders from which said objects are made. More particularly, depending on the EBM processing operations, it is envisaged providing a cleaning chamber made of the same metallic material as the components produced by means of EBM treatment, namely titanium or alloys thereof, cobalt-chrome or magnesium and alloys thereof.

In the context of the present description reference will be made to a cleaning chamber 2 made with titanium walls.

In this context, therefore, the entire sandblasting portion of the apparatus 1 is made of titanium components, namely the nozzles and the flexible pipes supplying the compressed air and the sandblasting powders are also made of titanium.

The structure of the cleaning chamber 2 is of a certain importance for the purposes of the present invention; however, this structure is optional in relation to the configuration of the powder recovery and recirculation system 3 which allows expressly the implementation of the method according to the present invention and which will be described in greater detail below. Therefore, the titanium structure of the chamber 2 and its components, which are all made of the same metallic material as the products produced by means of EBM, is of a secondary nature compared to the powder recovery and recirculation system 3 such that the invention may also be implemented with a chamber 2 having a conventional structure.

The fact of having the cleaning chamber 2 made of the same metallic material as the processing powders makes it easier to maintain optimum processing conditions and reduces contamination of the powders.

Advantageously, the cleaning chamber 2 is also kept under an overpressure of inert gas, preferably nitrogen (N) or argon (Ar). The jet emitted by the sandblasting nozzle is also formed with the same compressed gas.

Alternatively, the chamber 2 may be kept under an overpressure using plain air; however, for processing using powders of titanium, alloys thereof or other metallic powders, it is preferable, even though not indispensable, to use inert gases.

As mentioned above, in order to implement the method of the present invention, of particular importance is the provision of a particular system 3 for recovery and recirculation of the metal powders in which there is a powder treatment path starting from the said cleaning chamber 2.

This path is provided with filter means 4 which form part of the recovery and recirculating system 3 and are connected downstream of the cleaning/sandblasting chamber so as to allow the separation of any large-size and/or polluting particles and elements.

As clearly shown in FIG. 1, it is possible to envisage a connection A between the outlet of the filter means 4 and the chamber 2 so that the ELI powders may be supplied into the chamber 2 downstream of the filter means 4.

Along the powder treatment path it is also envisaged providing a magnetic separator 11 which is positioned downstream of the filter means 4, for extraction of particles of magnetic material from the powder recovered from the sandblasting environment and the EBM machine.

A sieve unit 12 is also provided downstream of the magnetic separator 11 for selecting the powder particle size most appropriate for processing purposes. By means of the sieve unit it is possible to filter further the powders in order to eliminate the parts with a smaller particle size which are those representing a potential fire hazard. The sieve unit 12 discharges at its outlet powders which may not be regarded as ELI powders since their oxygen content is not less than 0.12%, but as powders which have a controlled oxygen content, for example a maximum of 0.16%. These powders will be referred to below by means of the abbreviation ELI*.

Still with reference to FIG. 1, this shows a second optional connection B, or rather a connection replacing the connection A, which would allow the supply of the ELI* powders into the chamber 2, but downstream of the magnetic separator 11.

Advantageously, according to the present invention, a first buffer tank 9 is provided, said tank allowing the storage and stirring inside it of the ELI* metal powders which have been recovered from the sandblasting environment and which have already passed through the filter means 4, the magnetic separator 11 and the sieves 12.

By using this first buffer tank 9 it is possible to avoid stratification: moreover, owing to the presence of the second tank, it is possible to remove from this tank powder samples for an additional certification step, for example a step for certifying their oxygen content, without influencing the powder recovery and recirculation operations.

A third—optional—connection C, which replaces the connections A or B, may be provided in order to allow the supply of ELI* powders into the chamber 2, but with said powders being taken from the aforementioned first buffer tank 9.

Essentially, the ELI or ELI* powders may be supplied to the chamber 2 directly from the tank 7 or from one of the connections A, B or C downstream of the filter means 4, the magnetic separator 11 or the buffer tank 9, respectively.

The ELI* powders recovered by means of the connections A, B or C are a mixture of pure ELI powders and sintered powders which are mixed inside the treatment path and contain a predetermined and controlled percentage amount of oxygen. The ELI or ELI* powders may in any case be added also at other points along the path other than the tank 7, as is clearly shown by way of example also in FIG. 2. In any case, and in accordance with the present invention, the ELI or ELI* powders may be supplied at an access point along the powder treatment path, for example downstream of the cleaning chamber 2, but upstream of the filter means 4, as clearly shown in the variation of embodiment shown in FIG. 2. A second tank 10, which may be called a final storage tank, is also provided, being connected to the first tank 9 by means of a line provided with valve means 13.

Advantageously, it is precisely from this second tank 10 that the ELI* powders are taken in order carry out certification as to their chemical/physical properties. This second temporary storage tank 10 is used for the preparation of homogeneous batches of powders with a low oxygen content, for example in the case of Ti6Al4V with an oxygen content less than 0.16% (or in any case ranging between 0.13 and 0.16%) which are to undergo certification.

Essentially, the second tank 10 contains a regenerated batch which may be used as a batch of raw material for keeping the quality of the EBM production system constant.

At least one hopper 15 associated with one or more EBM apparatus which use the metal powders for sintering the three-dimensional objects is supplied downstream of this second tank 10 via valve means 14. The hopper 15 represents and is equivalent to a supply tank of the EBM apparatus.

Essentially, the regenerated powders which have an oxygen content which is low, but not as low as that of the ELI Powders, but high enough to keep the quality of the continuous production cycle constant, are taken from the second tank 10.

The powders thus regenerated may be reused in the process and in the EBM apparatus and enable:
an optimum yield of the melting operations;
virtually infinite reuse of the same powder batch until totally used up; and
a consequent significant reduction in the quantity of powders needed to replenish the machines.

Figure 2:
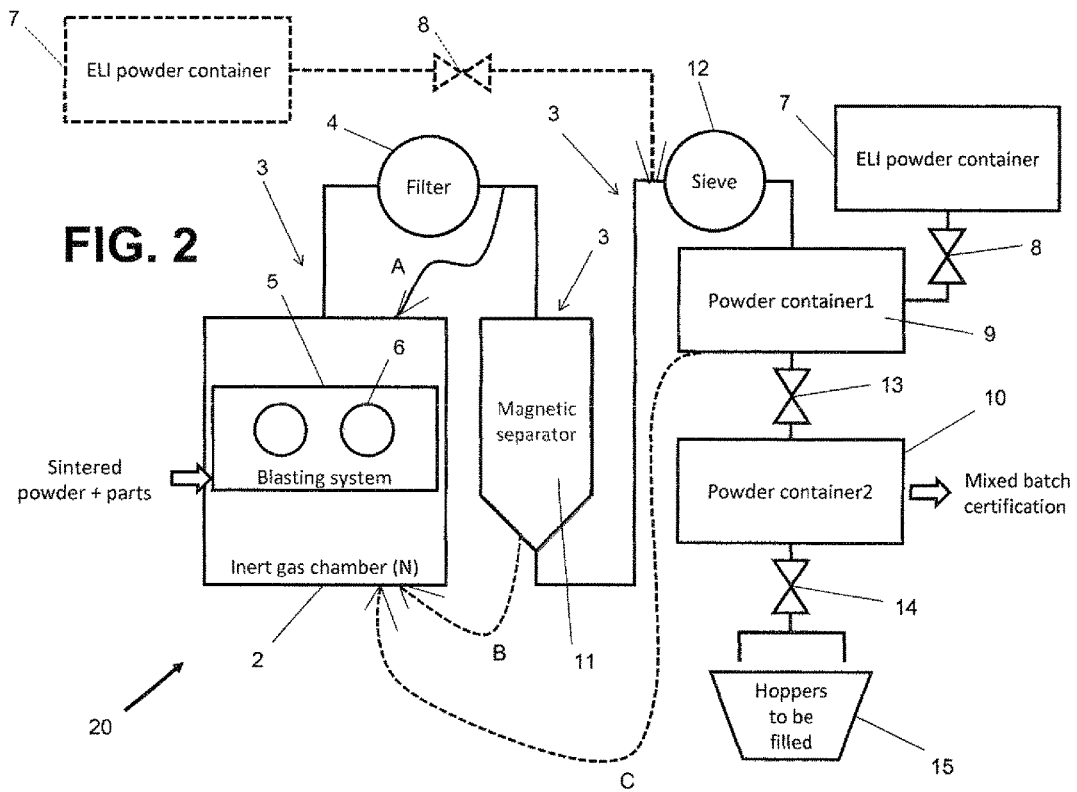
FIG. 2 shows a schematic view of a variation of embodiment of the apparatus according to FIG. 1.

In an alternative embodiment, which is shown with reference to the example of FIG. 2, the apparatus according to the invention may envisage closure of the metal powder recirculating cycle with supplying and direct topping-up of the ELI powder storage tank 7.

In this configuration shown in FIG. 2, the apparatus according to the invention is denoted overall by 20 and envisages that the tank 7 is supplied directly by the first buffer tank 9. However, it is also possible to top up the said first tank 9 with ELI powders stored in the tank 7.

Obviously, in the case also of this alternative embodiment of the apparatus according to the invention, the measure of manufacturing the components of the cleaning chamber 2 using the same metallic materials as the metal powders used for processing, in particular titanium, may be more or less adopted.

As a result of the apparatus according to the invention, in its alternative embodiments, it is possible to introduce components to be sandblasted directly into the sandblasting chamber 2 and certification of the regenerated powder batch inside the second tank 10 may be performed once the cleaning, recovery, filtering and recycling process has been completed.

Now, still with reference to the figures of the example of embodiment of the apparatus 1 or 20 according to the invention, the steps of implementing the method for regenerating metal powders according to the present invention will be described.

In order to illustrate more clearly the steps of the method reference will be made to a number of empirical formulae which allow the calculation of the quantity of powder with a low oxygen content to be added to the powder recovered inside the cleaning chamber 2.

The powder regeneration method according to the present invention envisages supplying the powder treatment path or directly the cleaning chamber 2 of the apparatus 1 or 20 with a predetermined quantity of ELI (Extra Low Interstitial) powder having a low oxygen content, normally less than 0.12%.

By supplying the apparatus 1 or 20 with powders which already have a desired low oxygen content it is possible to ensure control already of the step for recovery by means of erosion of the weakly sintered powders inside the cleaning chamber 2.

It is necessary, however, to take into account initially that the first step of processing and sintering the metal powders is carried out in an EBM apparatus which is already supplied with a first batch of ELI* powder with a controlled oxygen content, for example for Ti6Al4V at least less than 0.17%.

With this entire initial powder batch loaded in the EBM apparatus, at the end of processing the material produced, including the objects obtained by means of melting and the weakly sintered powders surrounding them, is loaded inside the PRS apparatus 1 or 20.

A quantity of ELI powder taken from the tank 7 and corresponding to the weight of the components made is then expressly added, according to the invention, inside the cleaning chamber 2.

The procedure then continues with the sandblasting operations during which the eroded powder is recovered by the recovery and recirculating system 3 and filtered or treated by the various components 4, 11 and 12.

The powders thus recovered are collected inside the first buffer storage tank 9.

By choosing to have two buffer tanks 9 and 10 it is possible to ensure continuous operation, performing mixing of the powders inside the sandblasting chamber 2 and collecting them initially inside the first buffer tank 9.

When the second buffer tank 10 is empty, an entire batch of the powder contained in the first buffer tank 9 is made to flow, through the valve means 13, into the second tank 10, which is then isolated, closing off the supply circuit.

Owing to this particular feature it is possible to form inside the second tank 10 a batch of regenerated powders which is completely new and different and may undergo certification.

Once the entire batch of metal powders has been used up or nearly used up inside the EBM apparatus intended for the production of the three-dimensional objects, the hopper 15 containing the powder batch is topped up with the regenerated powders contained inside the second buffer tank 10 of the apparatus 1 or 20.

If "x" indicates the quantity of ELI Powder, then the following equation is applicable thereto:

$$x = kg_{ELI}TOT - kg_{ELI}added \quad [1]$$

where:

$Kg_{ELI}$added represents the quantity, in kilograms, of ELI powders added during all the production steps carried out up to that moment, and $Kg_{ELI}$TOT may be defined by means of an equation obtained during tests:

$$Kg_{ELI}TOT = \left(\frac{1}{O_A - O_{ELI}}\right) \cdot \left[B \cdot \left(\frac{\sum_{j=1}^{i}\left(B_j \cdot \frac{O_j}{0.64}\right)}{B}\right) + L \cdot \left(\sum_{j=1}^{i} 0.010156 \cdot O_j\right)\right] - \left(\frac{O_A}{O_A - O_{ELI}}\right) \cdot (B + L)$$

wherein:

$O_A$ represents the initial percentage amount of oxygen in the used batch;

$O_{ELI}$ represents the percentage amount of oxygen in the ELI batch used for regeneration;

$O_J$ represents the percentage amount of oxygen in the material melted during the j-th EBM processing step;

B represents the quantity of weakly sintered powder sandblasted inside the cleaning chamber;

L represents the quantity of sintered powder produced and recovered by means of the treatment path which also includes the cleaning chamber 2.

As a result of the recovery and recirculating step it is possible to obtain a predefined quantity or batch of regenerated powder which, once it reaches the second buffer tank 10, may be certified with carrying out of a complete chemical analysis during which it is checked that the value of the percentage amount of oxygen in the recovered powders corresponds to the oxygen content of the initial powder before its use in the EBM machine, namely that it lies within a range of values of between 0.12 and 0.16%.

If the quantity x calculated by means of the formula [1] has a negative value, then and only then is it possible to add a quantity of powder with a higher oxygen content equal to y, defined by the following equation obtained by means of the lever rule:

$$y = \frac{kg_{MIX} \cdot (O_A - O_{MIX})}{O_y - O_A}$$

wherein:

$O_{MIX}$ represents the percentage amount of oxygen in the regenerated batch;

$O_Y$ represents the percentage amount of oxygen in the batch with a higher oxygen content; and $K_g$MIX represents the quantity, in kilograms, of the regenerated batch.

Consequently, in the light of the above considerations, it is clear that the method according to the present invention offers the major advantage of allowing correct execution of the metal powder management and regeneration operations, allowing full control over the oxygen content of the powders and ensuring processing operations with a greater yield.

The variants 1 and 20 of the apparatus which allow implementation of the method differ in terms of the points along the treatment path or the stage where the ELI or ELI* powder with low oxygen content is added, namely upstream or downstream of the process for recovery and filtering of the weakly sintered powder.

A person skilled in the art may also appreciate how the sequence of operations for filtering, separating the magnetic particles and sieving may be modified depending on the production requirements and the powder recirculation system.

With the method and apparatus according to the invention it is possible to introduce components to be sandblasted also directly into the sandblasting chamber and certification of the regenerated powder batch may be performed once the recovery and regenerating process has been completed.

What is claimed is:

1. Method for the recovery and regeneration of metal powders in EBM (Electron Beam Melting) applications, comprising a step for recovery of weakly sintered powders inside a cleaning chamber including at least one compressed-air nozzle for supplying powder for sandblasting three-dimensional objects obtained by means of EBM sintering of said metal powders, comprising a path for recovery and regeneration of said powders, comprising at least a first buffer tank inside which the regenerated powders are deposited and wherein metal powders with a predetermined oxygen content of less than 0.12% by weight are supplied at an access point along said path for recovery and regeneration, wherein the regenerated powders have an oxygen content that lies within a range of values of between 0.12% and 0.16% by weight, and wherein said cleaning chamber is formed with walls made of the same metallic material as the metal powders from which said three-dimensional objects are made to reduce powder contamination from the cleaning chamber.

2. The method according to claim 1, wherein the supply of said metal powders with the predetermined oxygen content is performed directly inside said cleaning chamber.

3. The method according to claim 1, wherein said cleaning chamber is kept under an overpressure of inert gas and that the jet emitted by the sandblasting nozzle is formed with the same type of compressed inert gas.

4. The method according to claim 1, wherein a second buffer tank is connected downstream of and supplied by the first buffer tank for topping up one or more hoppers or tanks of corresponding EBM sintering apparatus.

5. The method according to claim 4, wherein the regenerated powders of said second buffer tank undergo certification of the percentage oxygen content in said range of values between 0.12% and 0.16% by weight.

6. The method according to claim 1, wherein said walls are made of titanium or alloys thereof, cobalt-chrome or magnesium and alloys thereof depending on the powders used to produce the three-dimensional objects obtained by means of EBM.

7. The method according to claim 6, wherein the entire sandblasting portion of said cleaning chamber is made with metals corresponding to the powders of the objects produced, including said at least one nozzle and an associated flexible pipe.

* * * * *